US011372629B1

(12) United States Patent
Meister et al.

(10) Patent No.: US 11,372,629 B1
(45) Date of Patent: Jun. 28, 2022

(54) SYSTEMS AND METHODS FOR TENSOR SCHEDULING

(71) Applicant: Reservoir Labs, Inc., New York, NY (US)

(72) Inventors: Benoit J. Meister, New York, NY (US); Eric Papenhausen, New York, NY (US)

(73) Assignee: Reservoir Labs, Inc., San Diego, CA (US)

( * ) Notice: Subject to any disclaimer, the term of this patent is extended or adjusted under 35 U.S.C. 154(b) by 0 days.

(21) Appl. No.: 16/852,867

(22) Filed: Apr. 20, 2020

Related U.S. Application Data

(60) Provisional application No. 62/836,319, filed on Apr. 19, 2019.

(51) Int. Cl.
G06F 8/41 (2018.01)
G06N 3/08 (2006.01)

(52) U.S. Cl.
CPC .................. G06F 8/41 (2013.01); G06N 3/08 (2013.01)

(58) Field of Classification Search
CPC ... G06T 1/20; G06T 1/60; G06T 2207/20084; G06N 3/08; G06F 8/41
See application file for complete search history.

(56) References Cited

U.S. PATENT DOCUMENTS

| 9,489,180 | B1* | 11/2016 | Baskaran | G06F 8/443 |
| 2005/0251724 | A1* | 11/2005 | Matsumoto | H03M 13/033 |
| | | | | 714/752 |
| 2011/0271247 | A1* | 11/2011 | Hedley | G06F 8/51 |
| | | | | 717/106 |
| 2016/0098257 | A1* | 4/2016 | Meister | G06F 8/4434 |
| | | | | 717/161 |
| 2020/0249923 | A1* | 8/2020 | Tsugane | G06F 8/4441 |
| 2020/0293838 | A1* | 9/2020 | Li | G06N 5/046 |

OTHER PUBLICATIONS

Heaton Research; What are Tensors and Why are they Flowing? (TensorFlow); Heaton Research Inc.; retrieved on Feb. 25, 2021 (Year: 2017).*
Benoit Meister et al.; Polyhedral Tensor Schedulers ; IEEE; pp. 504-512; retrieved on Jan. 28, 2022 (Year: 2019).*
Thomas Nelson et al.; Generating Efficient Tensor Contractions for GPUs; IEEE; pp. 969-978; retrieved on Jan. 28, 2022 (Year: 2015).*

* cited by examiner

Primary Examiner — S. Sough
Assistant Examiner — Cuong V Luu
(74) Attorney, Agent, or Firm — Seyfarth Shaw LLP

(57) ABSTRACT

A technique for efficient scheduling of operations in a program for parallelized execution thereof using a multi-processor runtime environment having two or more processors includes constraining the type or number of loop optimization transforms that may be explored such that memory and processing capacity available for the scheduling task are not exceeded, while facilitating a tradeoff between memory locality, parallelization, and/or data communication between memory modules of the multi-processor runtime environment.

25 Claims, 8 Drawing Sheets

```
Algorithm 1 Permutation Tensor Scheduler
Require: Generalized dependence SCC graph G = (V, E)
1: for e ∈ E do
2:    Build clamping constraints, apply Farkas Lemma on
      0 ≤ θ(t) − θ(s) ≤ d under s, t ∈ P_e and eliminate
      all Farkas multipliers
3:    Build permutation constraints: ∑_i α_i = 1 and α ≥ 0
4:    Aggregate constraints from both into C_e(i)
5: end for
6: repeat
7:    for e ∈ E do
8:       Compute w, a vector of weights in [0, 100] that score
         loops based on a mixture of gaussians that consider
         parallelism, locality, and permutability
9:       Solve C_e(i) subject to objective function of Equation
         1
10:      if no solutions are found then
11:         Cut dependences between two strongly-connected
            components in the GDG and insert the appropriate
            splitter in the transformation matrices
12:      end if
13:      Add independence constraint to C_e(i): Intersect with
         α = 0
14:      Compute E_c: dependences carried by the current
         solution
15:      E ← E − E_c
16:   end for
17: until E = ∅
Ensure: A transformation matrix for each statement
```

```
for(i=0; i <= N; i++)
   for(j=0; j <= N; j++)
   S1: A[i+1][j] += B[j];
```

FIG. 1A $$\mathcal{D}_{S1} = \{(i,j) \in \mathbb{Z}^2 \mid 0 \leq i \leq N \ \wedge \ 0 \leq j \leq N\}$$

FIG. 1B $$f_A = \begin{array}{cccc} i & j & N & c \\ \hline 1 & 0 & 0 & 1 \\ 0 & 1 & 0 & 0 \end{array} \qquad f_B = \begin{array}{cccc} i & j & N & c \\ \hline 0 & 1 & 0 & 0 \end{array}$$

FIG. 1C

```
for (i=0; i < 100; i++)
   for(j=0; j < 100; j++)
      for(k=0; k < 100; k++)
         A[k][i] += B[k][i];
```

|   | i | j | k |
|---|---|---|---|
| → | 1 | 0 | 0 |
| → | 0 | 1 | 0 |
| → | 0 | 0 | 1 |

FIG. 2A

```
for (k=0; k < 100; k++)
   for(i=0; i < 100; i++)
      for(j=0; j < 100; j++)
         A[k][i] += B[k][i];
```

|   | i | j | k |
|---|---|---|---|
| → | 0 | 0 | 1 |
| → | 1 | 0 | 0 |
| → | 0 | 1 | 0 |

FIG. 2B

Algorithm 1 Permutation Tensor Scheduler

Require: Generalized dependence SCC graph $G = (V, E)$
1: for $e \in E$ do
2:     Build clamping constraints: apply Farkas Lemma on $0 \leq \theta(t) - \theta(s) \leq d$ under $s, t \in P_e$ and eliminate all Farkas multipliers
3:     Build permutation constraints: $\sum_i \alpha_i = 1$ and $\alpha \geq 0$
4:     Aggregate constraints from both into $C_e(i)$
5: end for
6: repeat
7:     for $e \in E$ do
8:       Compute $w$, a vector of weights in $[0, 100]$ that score loops based on a mixture of gaussians that consider parallelism, locality, and permutability
9:       Solve $C_e(i)$ subject to objective function of Equation 11
10:       if no solutions are found then
11:         Cut dependences between two strongly-connected components in the GDG and insert the appropriate splitter in the transformation matrices
12:       end if
13:       Add independence constraint to $C_e(i)$: Intersect with $\alpha = 0$
14:       Compute $E_c$: dependences carried by the current solution
15:       $E \leftarrow E - E_c$
16:     end for
17: until $E = \emptyset$

Ensure: A transformation matrix for each statement

FIG. 3

```
for (i=0; i <= 31; i++)
  for(j=0; j <= 31; j++)
    for(k=0; k <= 31; k++)
      for(l=0; l <= 31; l++)
        S1:Y_ijkl = 0.0;

for (i=0; i <= 31; i++)
  for(j=0; j <= 31; j++)
    for(k=0; k <= 31; k++)
      for(l=0; l <= 31; l++)
        for(m=0; m <= 31; m++)
          S2:Y_mjkl += X_ijkl * M_mi;
```

$$A_{S1} = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

$$A_{S2} = \begin{vmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{vmatrix}$$

Input Code

FIG. 5A

```
for (i=0; i <= 31; i++)
  for(j=0; j <= 31; j++)
    for(k=0; k <= 31; k++)
      for(l=0; l <= 31; l++)
        S1:Y_ijkl = 0.0;
        for(m=0; m <= 31; m++)
          S2:Y_ijkl += X_mjkl * M_im;
```

$$A_{S1} = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

$$A_{S2} = \begin{vmatrix} 0 & 0 & 0 & 0 & 1 \\ 0 & 1 & 0 & 0 & 0 \\ 0 & 0 & 1 & 0 & 0 \\ 0 & 0 & 0 & 1 & 0 \\ 1 & 0 & 0 & 0 & 0 \end{vmatrix}$$

Max Fuse

FIG. 5B

```
for (i=0; i <= 31; i++)
  for(j=0; j <= 31; j++)
    for(k=0; k <= 31; k++)
      for(l=0; l <= 31; l++)
        S1:Y_{ijkl} = 0.0;
      for(l=0; l <= 31; l++)
        for(m=0; m <= 31; m++)
          S2:Y_{ljkm} += X_{ljkm} * M_{il};
```

$$A_{S1} = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

$$A_{S2} = \begin{vmatrix} 0 & 0 & 0 & 0 & 1 \\ 0 & 1 & 0 & 0 & 0 \\ 0 & 0 & 1 & 0 & 0 \\ 1 & 0 & 0 & 0 & 0 \\ 0 & 0 & 0 & 1 & 0 \end{vmatrix}$$

Smart Fuse

FIG. 5C

SYSTEMS AND METHODS FOR TENSOR SCHEDULING

CROSS-REFERENCE TO RELATED APPLICATIONS

This application claims priority to and benefit of U.S. Provisional Patent Application No. 62/836,319, entitled "Systems and Method for Polyhedral Tensor Scheduling," filed on Apr. 19, 2019, the entire contents of which are incorporated herein by reference.

GOVERNMENT LICENSE RIGHTS

This invention was made with government support under Award No. DE-SC0017071, awarded by U.S. Department of Energy (DoE), Office of Science, Office of Advanced Scientific Computing Research. The government has certain rights in the invention.

FIELD OF THE INVENTION

This disclosure generally relates to techniques for scheduling for execution the operations specified in a source program and, in particular, to scheduling such operations for parallelized execution using two or more processors or processor cores.

BACKGROUND

In general, a source program can be considered a sequence of programming statements written in a particular programming language such as C, C++, JAVA, SCALA, R, Python, TensorFlow (TF) etc. The source program (simply "program," hereinafter) is compiled by a compiler to obtain an executable that can be executed to perform the operations specified in the program. One important task of a compiler is to perform scheduling. Scheduling, in itself, involves many tasks but, at a minimum, scheduling can be understood as generating a sequence of operations from the given program.

The sequence of operations generated by a compiler must not violate the logic represented by the specified program. For example, consider two statements: "S1: x=a+b; S2: y=x−c;" If specified in that order in the program, it follows that the addition operation must be performed and completed before the subtraction operation. Moreover, a memory-write operation storing the result of the addition operation at a memory location assigned to the variable "x" must be completed before a memory-read operation retrieving the value of "x" is initiated.

The memory-access operations involving "x" and, as a consequence, the statements S1 and S2, are thus understood as having a dependence relation. In this case, the dependence is read-after-write; other types of dependences include write-after-read and write-after-write. The task of generating a sequence of operations must not violate any of the dependences implied by the program. Not all operations/statements have a dependence relation, however. For example, another memory-read operation, to retrieve the value of the variable "c" may be completed before or after the memory-write and memory-read operations with respect to "x."

The above-described task involved in scheduling, i.e., deriving a valid sequence of operations, including arithmetic, logical, and memory access (read and write) operations, becomes increasingly complex when the variables involved are non-scalars, i.e., vectors (one-dimensional data structures or arrays), matrices (two-dimensional data structures), or tensors (three or more dimensional data structures). This is in part because the statements that specify operations involving such variables are often included with a loop or a loop nest (an outermost loop that includes one or more inner loops), to access systematically the different portions of the data structure in different dimension and, as such, the specified operations must be performed not just once, but several times (e.g., tens, hundreds, or even millions of times). The dependences between several iterations of different operations must be analyzed and must not be violate during scheduling, making the scheduling task complex.

Scheduling becomes even more complex when the program is to be executed using not just a single processor/core but using several (e.g., 2, 8, 32, 1024, or even more) processors or cores (collectively referred to as processors, hereinafter) of a multi-processor runtime environment. With more than one processors available, a scheduler performing the task of scheduling must not only identity and obey the dependences among various operations, but must also identify operations that are not dependent on one another, and schedule them for parallel execution using the available processors. This can increase the utilization of the available multi-processor runtime environment, and can speed-up the execution of the program. The scheduler may also need to account for other objectives such as, e.g., maintaining memory locality so that excessive thrashing of one or more cache memories does not occur.

To extract parallelism while also achieving other objectives, a scheduler often performs various optimizations, e.g., by applying one or more transforms to a loop or a loop nest, such as loop fusion, loop fission, loop permutation, loop reversal, loop skewing, loop tiling, etc. The benefit of each candidate transform, e.g., in terms of improved parallelism, is weighted against a potential penalty, e.g., in terms of decreased memory locality/cache thrashing, increased data communication, etc. Given the already complex nature of the scheduling task, the evaluation and exploration of many different optimizations and transforms can make the scheduling task excessively complex, i.e., the processor performing scheduling can run out of available memory or the memory allocated for the scheduling task. Alternatively, or in addition, the processor may not be able to perform scheduling within a specified or allocated time, such as a few minutes, a few hours, or even a few days. Indeed, the general problem of scheduling is commonly considered to be intractable.

Polyhedral scheduling is often employed for performing tradeoffs between parallelization, memory locality, and data communications. The lack of tractability of polyhedral scheduling is as old as its seminal algorithm. Algorithms that predate it may scale better, but use less expressive dependence models, such as dependence vectors, directions, etc. Intermediary expressiveness has been explored by limiting the number and type of constraints per variable. Finally, some cases were characterized in which the integrality constraint can be temporarily lifted. ILP can then be replaced by LP, which is more tractable.

The idea of distributing the search space over several iterations to speed up compilation in each iteration is employed in iterative compilation, where, for instance, the absolute values of scheduling coefficients may be bounded. A careful approach to adaptive schedule cost function was proposed, where the scheduling constraints and hierarchical objective are allowed to change adaptively for each schedule dimension, but this technique requires performing per-SCC (strongly connected component) scheduling first and, thus, it is generally not scalable. Some techniques use a hierarchical objective function for scheduling and, hence, cannot use generally available ILP solvers, and require slower parametric hierarchical ILP solvers. Some techniques, known as Selective Embedded Just-In-Time Specialization (SEJITS) involve identifying the sub-domain of the input application and applying specialized transformations.

SUMMARY

In various embodiments, techniques described herein generate and specify certain constraints for a scheduler so that a scheduler can produce a valid, parallelized schedule in an efficient manner. This is achieved, at least in part, by constraining the scheduler to evaluate and explore only a limited number of transforms, where the number of transforms to be explored is determined by taking into account the respective memory and/or processing requirements of different candidate transforms and the available or allocated processing capacity and memory space, such that the allocated processing capacity (e.g., in terms of processor time or processor cycles) and the allocated memory space are not exceeded.

Alternatively, or in addition, the type of the transforms explored may also be constrained. It was observed via experimentation that in operations involving tensors, a significant degree of parallelization can be achieved via loop fusion and/or loop permutation. As such, the transforms a scheduler may apply may be limited to fusion only, to permutation only, or to fusion and permutation only. Other types of transforms, such as skewing, tiling, may not be permitted at least during a first scheduling/compilation phase. These transforms may only be applied during an earlier or a later compilation phase. Limiting the types of transforms during a certain phase allows the scheduling to be performed not just at a granularity of one statement at a time (as is typically done by conventional schedulers), but simultaneously for a grouping of statements, which can further enhance the efficiency of scheduling.

Constraining the scheduler in these manners allows the scheduler to apply various transforms where the benefit-penalty evaluation can be performed using non-linear or even non-mathematical functions, e.g., certain mapping functions that can determine the benefit or penalty using a specified procedure. On one hand, the non-linear and mapping functions can more effectively weigh the benefits of a candidate transform (e.g., in terms of increased parallelism) against the costs or penalties of the transform (e.g., in terms of reduced memory locality, increased communication, etc.). As such, the use of these functions can yield an improved schedule. On the other hand, the computation cost, in terms of processing and/or memory requirements, of a non-linear or a mapping function is greater than that of a linear function. As such, conventional schedulers generally employ linear functions only. By constraining the exploration of transforms as described above, however, the techniques described herein allow the use of non-linear and mapping functions for transform evaluation, which can result in improved performance in parallelized execution of the program.

Accordingly, in one aspect a method is provided for transforming a program having one or more loop nests for parallelized execution using at least two processors. The method includes determining that a first statement within a first loop nest within a specified program accesses from memory one or more tensors and, for scheduling operations defined by the first statement at a first dimension of the first loop nest, selecting a first statement grouping that includes the first statement. The method further includes specifying constraints that limit a scheduler to applying to the first statement grouping loop fusion or loop permutation transforms only. The method may include invoking scheduling for the first statement grouping.

The specified program may include a second statement that access from the memory at least one of the one or more tensors that are accessed by the first statement. Accessing the same tensor via the two statements can create a read-after-write, write-after-read, or write-after-write dependence between the first and the second statements. The first statement grouping may include the second statement. In some embodiments, the first statement grouping is a strongly connected component (SCC).

Specifying the constraints may include determining a first loop index that maximizes an objective function, and designating as permutable within the first loop nest, a first loop that corresponds to the first loop index. The method also includes designating all other loops in the first loop nest as nonpermutable, so that only the first loop may be permuted by the scheduler.

The method may further include selecting a second statement grouping that: (i) includes a second statement that is included within a second loop nest and that access from the memory at least one of the one or more tensors accessed by the first statement, and where the second statement grouping (ii) has a dependence relation with the first statement grouping. Either one of the first and second statement groupings can be a source grouping (e.g., a source SCC) and the other one can be a destination grouping (e.g., a destination SCC), Specifying the constraints may include limiting the scheduler to apply loop fusion only, and not any other type of loop transform, and further limiting the scheduler to apply loop fusion only if a dependence distance between the first statement grouping and the second statement grouping, also referred to as the clamping distance, is zero. In some embodiments, specifying the constraints includes limiting the scheduler to apply loop fusion only, and further limiting the scheduler to apply loop fusion only if a maximum dependence distance between the first statement grouping and the second statement grouping, i.e., the clamping distance, is less than or equal to a specified threshold distance, such as 1, 2, 4, etc.

In some embodiments, specifying the constraints includes determining a second loop index that maximize the objective function, designating as permutable within the second loop nest, a second loop corresponding to the second loop index, and designating all other loops in the second loop nest as nonpermutable. The objective function may assign a respective weight to each loop in the first loop nest, a respective weight to each loop in the second loop nest, and a penalty proportional to a maximum dependence distance (i.e., the clamping distance) between the first statement grouping and the second statement grouping.

The weight assigned to a candidate loop in the first loop nest may be a first function of a dimension of the candidate loop within the first loop nest. Alternatively or in addition, the weight assigned to a candidate loop in the second loop nest may be a second function of a dimension of the candidate loop within the second loop nest. The first and the second functions can be the same or they can be different. The first function, the second function, or both can be linear, non-linear, or procedural functions. The non-linear function can be Gaussian or a mixed Gaussian function. The weight may be assigned to a candidate loop according to a cost function representing one or more of: locality of memory access resulting from permutation of the candidate loop, permutability of a candidate loop with other loops in the loop nest that includes the candidate loop, or parallelism of operations of the candidate loop. The cost function can be non-linear or procedural.

In some embodiments, specifying the constraints may include designating the first loop and the second loop as fusable only if the penalty is less than a sum of respective weights assigned to the first and second loop indices. The weight assigned to a candidate loop may be determined using an artificial neural network (ANN). The objective function may be specified, e.g., as an expression, or may be implemented using an artificial neural network (ANN).

The method may include repeating the steps of specifying constraints and invoking scheduling steps for scheduling the operations defined by the first statement at a second dimension of the first loop nest, where the second dimension is inner relative to the first dimension. The scheduler may be a polyhedral scheduler.

In another aspect, a system is provided for transforming a program having a loop nest for parallelized execution using a multi-processor runtime environment. The system includes a first processor and a first memory in electrical communication with the first processor. The first memory includes instructions that, when executed by a processing unit that includes the first processor or a second processor, and that is in electronic communication with a memory module that includes the first memory or a second memory, program the processing unit to determine that a first statement within a first loop nest within a specified program accesses from memory one or more tensors. The instructions further program the processing unit, for scheduling operations defined by the first statement at a first dimension of the first loop nest, to select a first statement grouping that includes the first statement, and to specify constraints that limit a scheduler to applying to the first statement grouping loop fusion or loop permutation transforms only. In various embodiments, the instructions can program the processing unit to perform one or more of the method steps described above.

In another aspect, a method is provided for transforming a program having a loop nest for parallelized execution using at least two processors. The method includes evaluating, using a non-linear or procedural evaluation function, respective computational improvements in scheduling operations defined by a first loop nest within a specified program. The scheduling involves transforming by a scheduler the first loop nest according to a number of candidate transforms, where evaluation of a particular candidate transform requires a particular memory space and a particular processing capacity. The method also includes limiting a total number of the candidate transforms the scheduler may apply such that: (i) a total memory space collectively required by all of the candidate transforms does not exceed an allocated memory space, or (ii) a total processing capacity collectively required by all the candidate transforms does not exceed an allocated processing capacity.

Processing capacity may be specified in terms of processor cycles or processor time. The evaluation function may represent one or more of: locality of memory access resulting from a permutation of a loop with other loops within the first loop nest, permutability of one or more loops with other loops within the first loop nest, or parallelism of operations associated with a loop in the first loop nest. A first statement within the first loop nest may access from memory one or more tensors. A second statement within a second loop nest may also access from the memory at least one of the one or more tensors that are accessed by the first statement. This may create a dependence between the first loop nest and the second loop nest, where each candidate transform that is evaluated maintains the dependence.

The scheduler may be a polyhedral scheduler or an artificial neural network (ANN)-based scheduler. The non-linear evaluation function can be a Gaussian or a mixed Gaussian function.

In another aspect, a system is provided for transforming a program having a loop nest for parallelized execution using a multi-processor runtime environment. The system includes a first processor, and a first memory in electrical communication with the first processor. The first memory includes instructions that, when executed by a processing unit that includes the first processor or a second processor, and that is in electronic communication with a memory module that includes the first memory or a second memory, program the processing unit to evaluate, using a non-linear or procedural evaluation function, respective computational improvements in scheduling operations defined by a first loop nest within a specified program. The scheduling involves transforming by a scheduler the first loop nest according to a number of candidate transforms, where the evaluation of a particular candidate transform requires a particular memory space and a particular processing capacity. The instructions also program the processing unit to limit a total number of the plurality of candidate transforms such that a total memory space collectively required by the candidate transforms does not exceed an allocated memory space or a total processing capacity collectively required by the candidate transforms does not exceed an allocated processing capacity. In various embodiments, the instructions can program the processing unit to perform one or more of the method steps described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIG. 1A is an example nested loop having a statement specifying computations to be performed;

FIG. 1B shows the iteration domain of the statement in FIG. 1A;

FIG. 1C shows the memory access functions for the statement in FIG. 1A;

FIG. 2A depicts an example program having a loop nest and its corresponding identity schedule;

FIG. 2B shows the transformed code of the program of FIG. 2A, and the corresponding schedule after tensor scheduling, according to one embodiment;

FIG. 3 shows a tensor scheduling algorithm, according to one embodiment;

FIG. 5A shows an example program;

FIG. 5B shows a transformation of the example program shown in FIG. 5A, obtained using one embodiment of a tensor scheduler; and FIG. 5C shows another transformation of the example program shown in FIG. 5A, obtained using another embodiment of the tensor scheduler.

DETAILED DESCRIPTION

I. Motivation

Figure 4A:
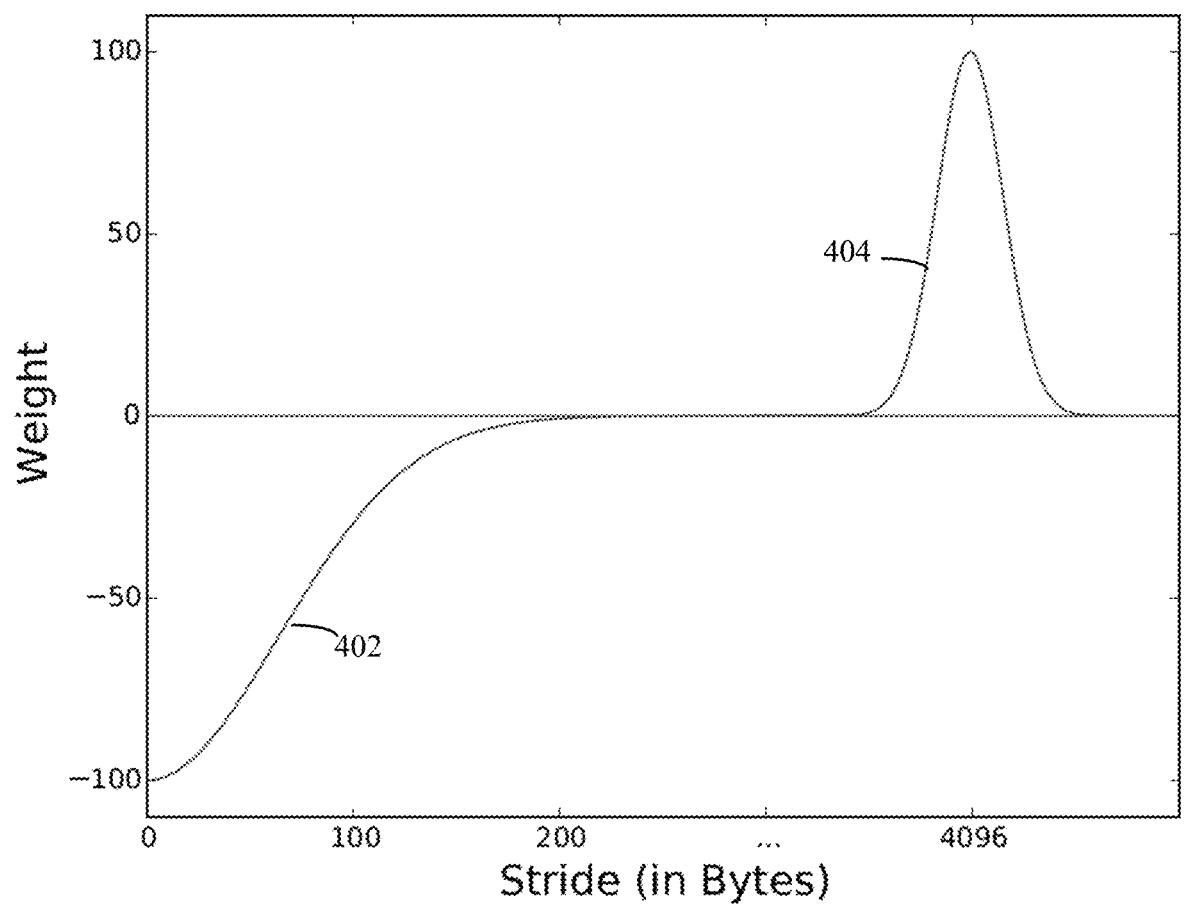
FIG. 4A depicts two non-linear cost functions, each based on locality cost.

It is well known that most of the computation time in many compute-intensive programs is spent in a small section of the program that contains nested loops. These loops can often be parallelized and optimized for cache locality, vectorization, etc. Manual loop optimization and parallelization, however, can be fastidious and error prone. The polyhedral model offers a compact and precise way of representing operations performed in such loops, as well as transformations thereof, data spaces, and dependences as sets of points in a vector space. Such points can be defined by affine constraints, i.e., polyhedra. These constraints form a static representation and encapsulate a conservative approximation of the program semantics.

A vast body of literature relies on its mathematical representation to perform a broad range of program optimizations, which subsume loop transformations as known traditionally. Polyhedral optimization is usually performed as a series of passes, with specific roles such as exposing parallelism and data locality, forming tasks, distributing such tasks across processor grids, generating communications and synchronizations, and more. Once optimized, programs are rendered into an imperative (but optimized and usually parallel) form, in which they can be optimized further through traditional compiler flows.

However, the tractability of polyhedral compilation remains limited because some of its passes rely on analyzing high-dimensional polyhedra with algorithms (such as integer linear programming (ILP)) that do not scale well with the number of dimensions of the problem. Polyhedral scheduling, whose typical role is to expose loop parallelism and tilability while optimizing for data locality, is one of such passes. In fact, in our experience, most of the polyhedral compilation time tends to be spent in the polyhedral scheduling pass, and existing literature also acknowledges this issue.

This lack of tractability is due to the way schedules are being computed, which is roughly as follows. The ordering of data accesses in the original program (i.e., dependences) are expressed in the product space of iteration spaces of all statements considered for scheduling. The space of semantically correct transformations is expressed by introducing new variables (so-called Farkas multipliers) that relate the constraints of the former space to coefficients of the affine transformation that the algorithm is looking for. The result is a polyhedral set of legal transformations, within which an optimal solution is searched using linear programming. Since we consider the Cartesian product of combination of per-statement constraints, the dimensionality of the polyhedron expressing the set of legal transformations grows as the product of the number of statements and the number of iteration space constraints per statement. The optimality of the solution is defined by the (linear) objective function chosen by the particular polyhedral scheduler under consideration. Modern objective functions typically express a trade-off between often-conflicting factors such as parallelism and data locality. Formulations in use in the current polyhedral mappers are usually looking for optimal integer schedules (using an ILP), which does not scale well with the size of the problem.

Here, we acknowledge that a significant portion of loop codes already have enough loop parallelism to fulfill the needs of the targeted architecture. We show that for these codes, more tractable polyhedral scheduling algorithms are applicable, which only deal with obtaining locality while preserving enough parallelism for these programs. Because most of the adequate codes involve tensors (data structures having three or more (e.g., 4, 8, 12, 20, etc.) dimensions, we call these scheduling techniques "tensor schedulers."

The rest of the discussion is organized as follows: After describing polyhedral scheduling in section II, we present the general idea that the tensor schedulers are based upon, in section III. Then, we detail three tensor scheduler versions, with increasing sophistication, in section IV. We show in particular how the problem can be reduced to very small linear programming (LP) problems, and that non-linear cost functions can be introduced, to more accurately model cache behavior and model tradeoffs between parallelism, locality, and permutability at different levels. We evaluate scalability vs. schedule quality gains in section V, and offer conclusions in section VI.

II. Background

The polyhedral abstraction represents program semantics in a concise, mathematical way through sets of affine constraints that make up the faces of a polyhedron. Changing the shape of this polyhedron affects the execution order of the code, which impacts performance. The mathematical representation allows for the use of well-established linear programming techniques to find an ideal shape. Note that the polyhedral model handles not only polyhedra, but also unions thereof, which we call domains from this point on.

Given an input code, a generalized dependence graph (GDG) is constructed. This is a directed multigraph in which nodes represent statements and edges represent dependences. Statements are represented through their iteration domains and array access functions. An iteration domain is formed from the bounds of the loops surrounding a statement and contains all of the instances in which the statement is executed.

FIG. 1 shows a simple example of a statement nested under two loops and its corresponding iteration domain and array access function. Each integer point or iteration vector $\vec{i}_{S1}$ in the iteration domain, $\mathcal{D}_{S1}$, represents a timestep, or instance, in which the statement is executed. Specifically, it defines specific values for the surrounding loop iterators. Array access functions show the array accesses of a statement as a matrix in which the rows map to a dimension of the array and the columns correspond to the loop iterators, loop-invariant expressions (called parameters) and constants.

A dependence occurs when two statements access some memory location and at least one of those accesses is a write. A legal schedule is one that respects ordering constraints defined by dependences. Dependences are represented through a polyhedral domain. A dependence $\mathcal{P}_{S \to T}$ represents all of the iterations in which statement T depends on statement S. $\mathcal{P}_{S \to T}$ is defined by the constraints:

$$\mathcal{P}_{S \to T} = \begin{cases} \vec{s} \in \mathcal{D}_S \\ \vec{t} \in \mathcal{D}_T \\ \vec{s} \prec \vec{t} \\ f_S(\vec{s}) = f_T(\vec{t}) \end{cases}$$

where $f_S$ and $f_T$ define the aliasing memory accesses of statements S and T. The relation $\vec{s} \prec \vec{t}$ is the lexicographic precedence constraint, which denotes that iteration vector $\vec{s}$ (also denoted $\vec{1}_s$) comes before the iteration vector $\vec{t}$ (also denoted $\vec{1}_t$) and is defined as:

$$\exists i, (s_1, s_2, \ldots, s_i) = (t_1, t_2, \ldots, t_i) \hat{s}_{i+1} < t_{i+1}$$

The goal of a polyhedral scheduler is to schedule when statements are executed. The scheduling process is done by finding a one-dimensional scheduling function (also often called hyperplane), $\theta_S$, for each dimension of each statement S:

$$\theta_S(\vec{i}_S) = \vec{\alpha}_S \cdot \vec{i}_S + \vec{\gamma}_S \cdot \vec{n} + \gamma_S^0 \quad (1)$$

where $\vec{\alpha}_S$ and $\vec{\gamma}_S$ are vectors of constants and $\vec{n}$ is a vector of program parameters. Each function maps to a loop in the transformed code and, together, form the multi-dimensional affine schedule function:

$$\Theta_S(\vec{i}_S) = \begin{pmatrix} \theta_S^1 \\ \vdots \\ \theta_S^m \end{pmatrix} \begin{pmatrix} \vec{i}_S \\ \vec{n}_S \\ 1 \end{pmatrix} \quad (2)$$

where S is an m dimensional statement. The $\vec{\alpha}_S$ and $\vec{\gamma}_S$ vectors of the $\theta$ function in Equation (2) are often represented with their own matrices such that:

$$A_S = \begin{pmatrix} \alpha_{1,1} & \cdots & \alpha_{1,m} \\ \vdots & \ddots & \vdots \\ \alpha_{m,1} & \cdots & \alpha_{m,m} \end{pmatrix} \Gamma_S = \begin{pmatrix} \gamma_{1,1} & \cdots & \gamma_{1,n} & \gamma_1^0 \\ \vdots & \ddots & \vdots \\ \gamma_{m,1} & \cdots & \gamma_{1,n} & \gamma_m^0 \end{pmatrix}$$

$$\Theta_S = (A_S \ \Gamma_S)$$

Dependences provide a convenient encoding of program semantics. A transformation is legal if and only if the dependences are preserved, i.e. $\Theta_S(\vec{s}) \prec \Theta_T(\vec{t})$. The exact representation of dependence polyhedra expands the transformation options available compared to traditional compiler optimizations.

III. General Idea

An important idea of our work is that there exists a class of programs in which many of the transformations that are typically considered in the scheduling process are not needed. For this class of programs, which we refer to as tensor codes, transformations such as skewing, scaling, and loop reversal will not necessarily yield more optimal code. These are codes that do not have many loop carried dependences in the input code and so identifying parallel loops is generally straightforward. Performance in these codes comes from identifying the right combination of fusion/fission and loop permutation. Limiting to this subset of transformations opens opportunities for both improving compiler scalability and improving performance cost models.

Let us define a permutation hyperplane, $\theta_{pi}$, as a special hyperplane that replaces $\alpha$ in Equation (1) with the i-th standard basis vector:

$$\vec{p}_i = \underbrace{0 \ 0 \ 0}_{0 \ldots i-1} \ \underbrace{1}_{i} \ \underbrace{\ldots \ 0 \ 0 \ 0}_{i+1 \ldots d} \quad (3)$$

$$\theta_{pi}(\vec{i}) = \vec{p}_i \cdot \vec{i} + \vec{\gamma} \cdot \vec{n} + \gamma_0$$

The tensor scheduler constructs a schedule exclusively from permutation hyperplanes. In fact, there is a bijective mapping from loops in the input code to permutation hyperplanes. FIG. 2A shows an example of a simple loop nest and its corresponding permutation hyperplanes.

A. Scalability Improvement

We use schedulers that build one scheduling dimension at a time as a starting point. Schedulers that build a multi-dimensional schedule at once exist, but they require solving much more complex problems, and are consequently less scalable. Polyhedral scheduling generally has three stages. The first stage defines a set of constraints, based on dependences, that describe the set of legal schedules. The second stage identifies an optimal schedule by solving an ILP problem within the set of legal schedules. Finally, additional constraints are added to the space of legal solutions to ensure that all subsequent schedules are linearly independent with the schedule found in stage two. Unfortunately, none of these stages scales smoothly with the number of statements and loop dimensions.

We address scalability in the first stage by using a single schedule per a strongly connected components (SCC) instead of statements. SCCs are formed by statements that have cyclic dependences (i.e. they depend on each other). This reduces the dimensionality of the polyhedra containing the set of legal solutions. Other types of groups of related statements, generally referred to as a statement grouping, may also be used.

One other form of groupings may take into account the number of instructions to be executed per group at each iteration. Parallelization among the processing elements of a vector processor can require smaller groups (down to one operation) to optimize for instruction-level parallelism, while parallelization across cores may not need to take into account this kind of parallelism and can afford bigger groups in order have a more scalable scheduling process.

Another type of grouping may be based on the number of store operations. Dataflow analysis can be more difficult to apply to statements that perform more than one write/store. Grouping may also be based on the weakness of data accesses. It is sometimes possible to group some or all conditionally-controlled accesses to a data element into one group. When all of them can, grouping turns "weak" accesses (i.e., accesses that may occur when a corresponding condition is true) into "strong" accesses (i.e., accesses that generally do occur). In some cases, grouping may be based on the ability to hide local, temporary values from the scheduler. Such values may be produced by one operation in the group and fully consumed within other operations in the same group, within the same iteration.

Groupings may also be based on the amount of similar array accesses in the to-be-grouped statements. The number of constraints in the feasible space of a scheduling problem is generally closely related to the number of array references per statement. Grouping operations with equal array references can make it possible to express these equal or equivalent references as a single array reference in the scheduling problem. In some cases, grouping takes into account heuristics about the likelihood that some operations will require the same schedule. Among them, if the linear part (i.e., the part that does not involve loop-constants) of data-structure references accessed by two operations is the same, we may choose to place both operations in the same group.

The second stage relies on solving an ILP optimality problem, which is NP-hard. To be tractable, the number of constraints and dimensions in the problem needs to stay low enough. The ILP constraints in traditional polyhedral schedulers has a O((m+n)mn) size on average for m constraints with n variables. Scalability is improved with our tensor scheduler in two ways for this stage. First, the restriction to permutations introduces many equalities in the ILP constraints, effectively reducing the dimensionality of the problem. Second, we only have one schedule to find per SCC as explained above. Last, we only schedule two SCCs (or fused SCCs) at a time. This effectively makes n depend only upon the maximum loop depth in either SCC, as opposed to the number of statements times such depth.

The final stage of the scheduling process augments the ILP formulation to ensure that the next schedule dimensions to be found are linearly independent from the scheduling hyperplanes found so far. This is typically done by finding the orthogonal subspace $H_S^\perp$ of the multi-dimensional schedule found so far for S, $H_S$.

$$H_S^\perp = 1 - H_S^T(H_S H_S^T)^{-1} H_S \quad (4)$$

For the next schedule $\vec{\theta}_S$ to be linearly independent with $H_S$ the following condition must hold true.

$$H_S^\perp \cdot \vec{\theta}_S \neq \vec{0} \quad (5)$$

Alternatively, if bounded coefficients are imposed for $\theta_S$, orthogonality can be ensured by adding extra ILP constraints that exactly exclude being in $H_S$.

For our tensor schedulers, the orthogonal subspace can be identified in a straightforward manner. Given a permutation hyperplane, $\vec{\theta}_{pi}$ linear independence can be achieved by adding the constraint i=0 to the space of legal solutions.

B. Cost Model Improvements

Because the polyhedral model depends on solving an ILP based on affine constraints, the performance cost models must also be affine. This is typically done with the minimum latency formulation. Given a vector of program parameters, $\vec{n}$, the minimum latency formulation proposes to bound the maximum dependence distance with an affine function L of the parameters:

$$L = \vec{h} \cdot \vec{n} + k$$

such that, $$L(\vec{n}) - \theta(\vec{i}_S, \vec{i}_T, \vec{n}) \geq 0, \forall (\vec{i}_S, \vec{i}_T, \vec{n}) \in \mathcal{P}_{ST} \quad (6)$$

In practice, however, this is not a particularly beneficial model of performance. It does not take into account effects due to caching or memory access pattern. Modeling performance as a linear function is a difficult problem since performance is inherently non-linear.

The restriction to permutation hyperplanes presents an opportunity to improve the quality of the cost models. The bijective mapping of loops to hyperplanes means that the number of potential schedules at any level is relatively low (i.e. the dimensionality of the loop nest). This allows us to examine each loop in the input code and come up with a weighting for determining how desirable it would be to permute a loop to a particular level. This weighting vector can then be incorporated into the ILP objective function.

$$\sum_i \vec{w_i} \cdot \vec{p_i} \quad (7)$$

This objective function does not need to be hierarchical. As a result, we can use off-the-shelf ILP solvers, which are much faster than any parametric hierarchical ILP. FIG. 2B shows an example of scheduling permutation hyperplanes based on a cost model designed to optimize the memory access pattern. With our formulation, this can be done by examining the stride with respect to each loop and setting the appropriate values in the weight vector:

$$\vec{\omega} = [1\ 0\ 100]^T$$

Solving the ILP to maximize Equation (7) gives the schedule shown in FIG. 2B. Note how the innermost loop has temporal locality while the middle and outer loops have spatial and poor locality respectively. What makes this particularly powerful is that the weighting vector can be computed by any cost model; including non-linear models. The linear ranking function of Equation (7) allows us to separate the cost model from scheduling and the restrictions it imposes.

C. Applicability

A significant portion of codes considered for polyhedral optimization have plenty of natural loop parallelism, including elementwise computations, matrix multiplications, tensor contractions and sequences thereof. In hierarchical polyhedral optimization, code gets scheduled once per level of the hierarchy. The first mapping level typically extracts a lot of loop parallelism, making subsequent levels often only need a tensor scheduler.

IV. Scalable Scheduling in the Permutation, Fusion Space

The family of schedulers we propose here combine several features, each of which can improve scalability. First, we consider one schedule transformation per SCC of the GDG (or per statement grouping, in general), which can greatly reduce the dimensionality of the problem. This is especially true since all the statements nested in the same loop in the input program have, by definition, similar loop constraints. We reduce the dimensionality of the search space by collapsing all per-statement schedule dimensions onto one set of dimensions for the whole statement grouping (e.g., an SCC), effectively intersecting their individual schedule validity constraints. The discussion below uses SCCs as an example, for the simplicity of discussion. The techniques described below apply to other types of statement groupings, as well.

Second, SCCs may be greedily scheduled by pairs, in an order given by an estimate of the amount of data shared among the SCCs. Such amount is computed from the dependence relations between the SCCs. The goal is to evaluate: (1) what is the best fusion and permutation combination, and (2) is it worth fusing, if the only way to do so is by permuting in a highly undesirable way The goal may also include evaluating whether it is worth permuting if the cost of fusing too high. When SCC nodes are fused, it forms a fused subgraph, which gets scheduled with another adjacent SCC. Statements in a fused subgraph will share a common loop in the generated code.

Third, we use an adaptive cost model. When one or both nodes being scheduled by the tensor scheduler belong to a fused subgraph, the criteria for fusion becomes stricter. Nodes in a subgraph cannot have their schedule changed, because altering the schedule could violate the conditions under which the nodes were fused in the first place. Also, merging a new node into a fused subgraph requires all SCC edges between the node and subgraph to be evaluated.

In the remainder of this section, we present three types of tensor schedulers. The first only performs fusion only if there is a zero dependence distance between two SCC nodes. The second is parametric, which allows for fusion plus a constant shift. The third incorporates permutation to find the best combination of permutation and fusion.

A. Simple Tensor Scheduler (STS)

The simple tensor scheduler only attempts to fuse SCC nodes, without any loop permutations. As a result, the A transformation matrix for each statement remain the identity. The STS attempts to maximally fuse all SCC nodes at each scheduling level, but only if the dependence distance is zero. Although fusion is possible with a non-zero dependence distance, it is not always desirable. Fusion with a non-zero dependence distance may turn a parallel loop into a sequential one (the non-zero dependence meaning that the dependence is carried by the loop). Furthermore, if the dependence distance is large, fusion may not provide any benefits to locality; since there is a higher chance that data may be evicted from cache before it can be reused. The STS considers zero-distance fusion to be always desirable, which is mostly true since it does not affect the level of parallelism and data between the fused statements is reused in the same iteration. An exception is when fusion introduces too much register pressure, which can be handled by cost models as presented below.

For two SCC nodes, A and B at scheduling level i, we check the following condition:

$$\theta_{pi}^B + \theta_{pi}^A = 0 \supseteq \mathcal{P}_{ST\ A \to B} \tag{8}$$

where $\theta_{pi}^B$ and $\theta_{pi}^A$ are B's and A's $i^{th}$ permutation hyperplanes, respectively. When Equation (8) holds true, this indicates that the $i^{th}$ loop levels of A and B can be safely executed at the same time without violating $\mathcal{P}_{S \to T}$.

B. Parametric Tensor Scheduler (pTS)

The parametric tensor scheduler relaxes the zero dependence distance constraint required by the STS. The pTS fuses SCCs as long as the dependence distance is bounded by a constant. Furthermore, it identifies a $\gamma_0$ shift that will minimize this dependence distance. This is done by solving a linear programming problem subject to a set of clamping constraints. Clamping constraints define a set of parallel hyperplanes that bound the dependence polyhedron. Every point in $\langle \vec{s}, \vec{t} \rangle \in \mathcal{P}_{S \to T}$ is contained by the half spaces:

$$\theta_B(\vec{t}) + \theta_A(\vec{s}) \geq 0$$

$$\theta_B(\vec{t}) - \theta_A(\vec{s}) - d \geq 0 \tag{9}$$

Equation (9) defines two parallel hyperplanes separated by a constant distance, d, called the clamping distance. Minimizing the clamping distance basically gives a scheduling hyperplane that minimizes the dependence distance and allows A and B to be fused.

When the distance is constant, there is a tradeoff between $\gamma_0$ and d. By setting $\gamma_{B_0} - \gamma_{A_0} = d$, the dependence distance can be reduced to zero. This implies that if either A or B have not yet been scheduled (i.e. they do not belong to a fused subgraph) and there exists a constant dependence distance, then a schedule exists that allows A and B to be fused with a zero dependence distance.

C. Permutation Tensor Scheduler (PERTS)

The permutation tensor scheduler extends the parametric tensor scheduler with the inclusion of permutation transformations. This can greatly improve the quality of the generated schedules, by exploring tradeoffs between fusion and permutation. Fusing some statements could restrict the permutations available and vice versa. For the other tensor schedulers, fusion is always beneficial because the loop ordering was fixed. The scheduling matrix for each statement remains the identity regardless of fusion. This tradeoff leads to two types of fusion heuristics—max fuse and smart fuse. The max fuse scheduler always performs fusion when possible, whereas the smart fuse scheduler only fuses when it is expected to give better performance.

Algorithm 1 shown in FIG. 3 describes the PERTS. In line 2, as for the parametric tensor scheduler (pTS), clamping constraints are used to minimize the dependence distance between fusable statements. Note that we eliminate the Farkas multipliers, which presumably improves scalability as the number of unknowns in the resulting ILP is halved without significantly increasing the number of constraints. Because E is the set of SCC edges, each dependence edge is a set of convex polyhedra. A single set of constraints is formed by intersecting the constraints that define the set of valid schedules. Eliminating the Farkas multipliers simplifies this intersection. Lines 3 and 4 build permutation constraints into the clamping formulation. Instead of using a fixed permutation hyperplane based on the scheduling dimension, the α values are treated as unknowns. We restrict the α values to permutations:

$$\sum_{i=0}^{mS} \alpha_i = 1,\ \alpha \geq 0,\ \alpha \in \mathbb{Z}^{mS} \tag{10}$$

where mS is the dimensionality of a statement grouping S, i.e., the number of dimensions of a loop nest associated with the statement grouping mS. Equation (10) requires that of the mS loops in the loop nest, one and only one can be permuted.

Selection of the permutation hyperplane is handled by assigning a weight co to source and destination permutation hyperplanes for the current schedule dimension, and considering the following objective function:

$$\mathrm{argmax}(\Sigma_i \omega_{\alpha_{src}}(i) \cdot \alpha_{src}(i) + \Sigma_j \omega_{\alpha_{dst}}(j) \cdot \alpha_{dst}(j) - 100 \cdot d) \tag{11}$$

Equation (11) considers together a pair of SCCs, designated as a source (src) SCC and a destination (dst) SCC, and having a dependence therebetween. Maximizing this objective function yields a value of a loop index i and a loop index j. These loop indices indicate that the i-th loop in the loop nest associated with the source SCC and/or the j-th loop in the loop nest associated with the destination SCC may be permuted, and/or the two SCCs may be fused. The permutation may be beneficial only if the cost of fusion (e.g., in terms of loss of parallelism), as indicated by the clamping distance d is not excessive. In some cases, the weights are normalized to a range [0, 100] and, as such, the clamping distance is also weighted by the constant 100. This constant and the weight ranges are adjustable.

Figure 4B:
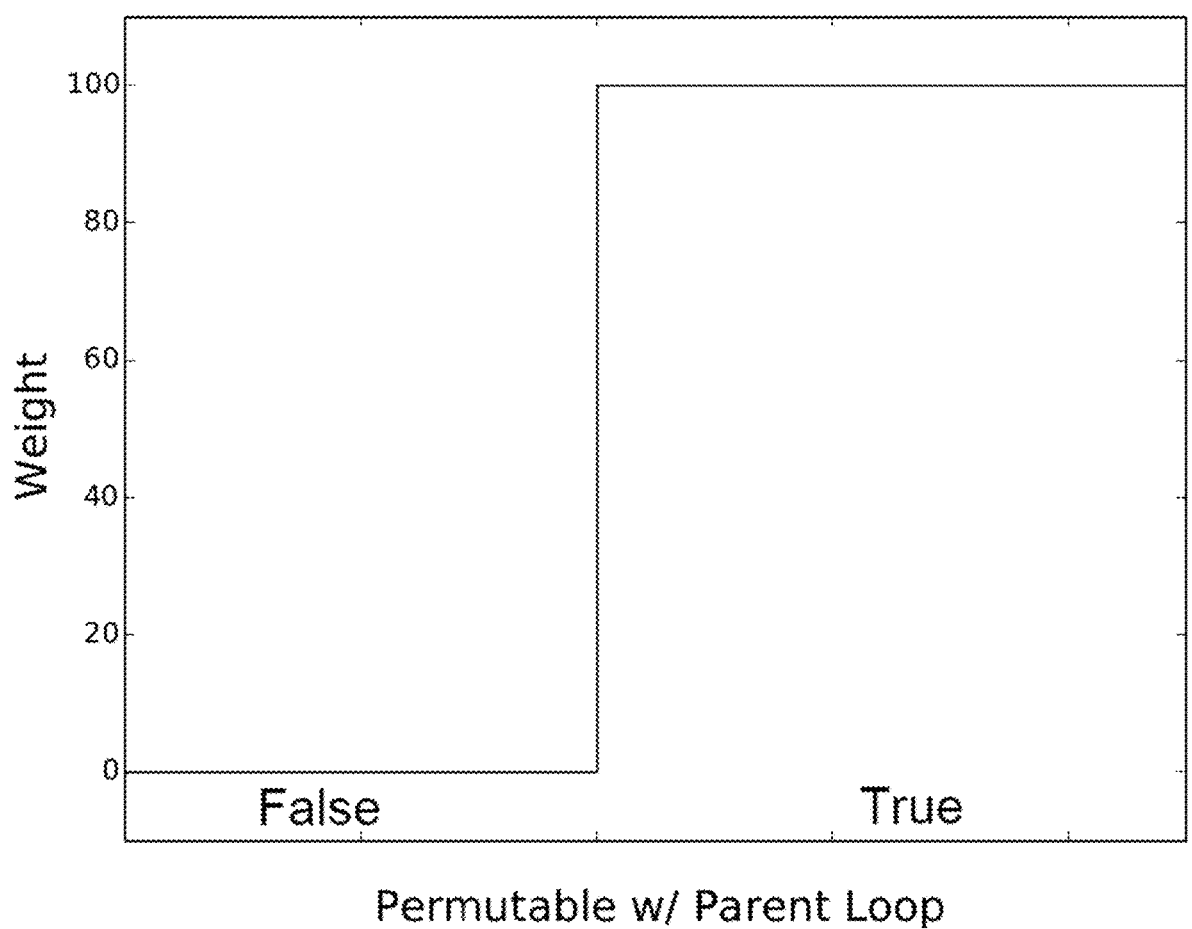
FIG. 4B depicts a non-linear cost function based on permutability cost.
Figure 4C:
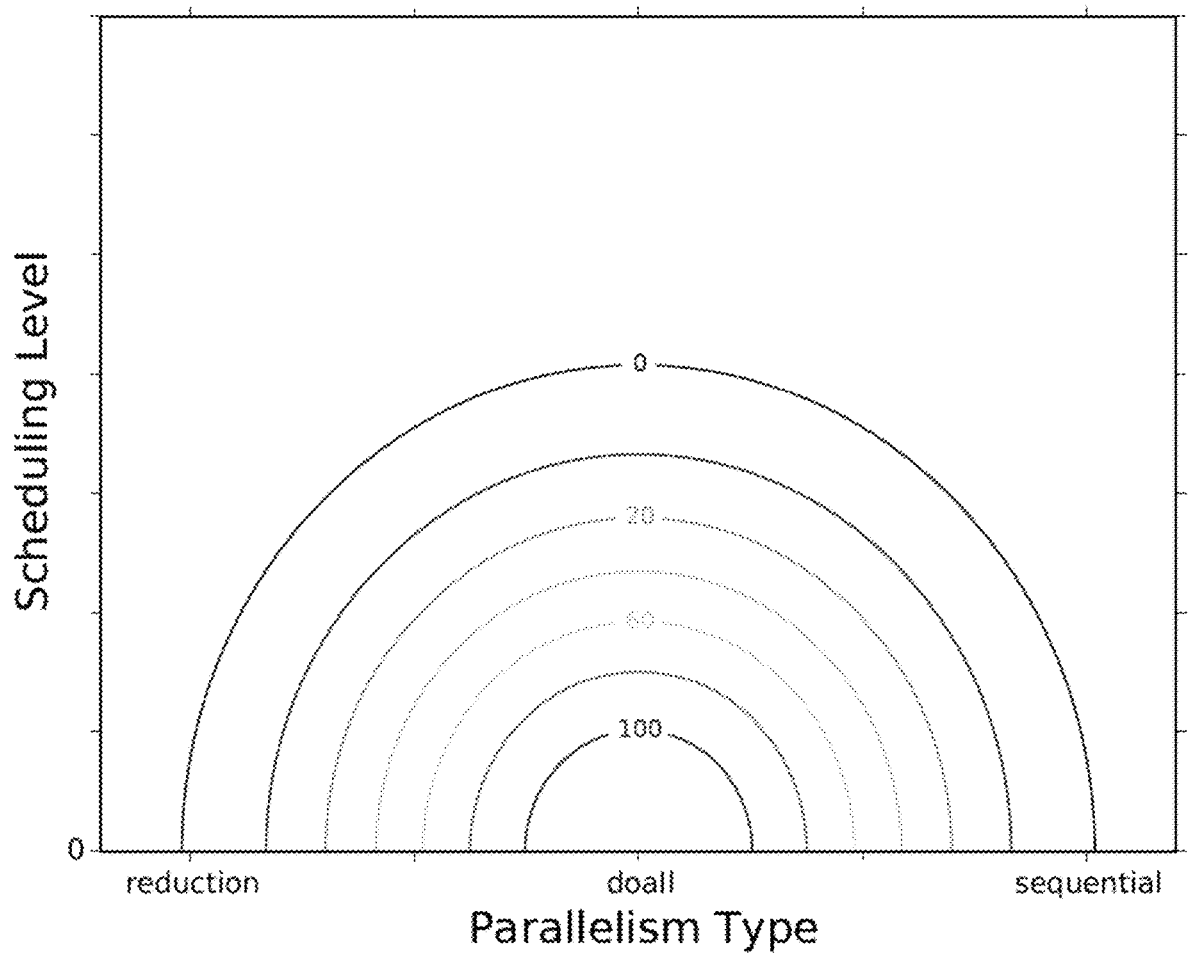
FIG. 4C depicts a non-linear cost function based on loop type.

The weighting vectors in Equation (11) may be computed from a non-linear cost model that may include one or more of the three separate models shown in FIGS. 4A-4C. Each model represents a particular aspect of performance: locality, permutability, and parallelism. A weight between 0 and 100 is assigned to the hyperplane by averaging the weights given by each of the cost models. This weight determines how desirable it is for a permutation hyperplane to be assigned at the current scheduling level. The weight range is adjustable.

FIG. 4A shows an example cost model for locality, a mixture of two Gaussians. The x-axis represents the stride of the loop a permutation hyperplane represents, while the y-axis gives the weight. The Gaussian curve 402 is centered at zero and has standard deviation equal to the cache line size. This Gaussian gives a high negative score to loops that have spatial and temporal locality. Note that the score is negative because scheduling is performed from the outermost to innermost dimension of a loop nest. Loops that have spatial locality are only useful if they are at the innermost position. Thus, this model effectively saves scheduling hyperplanes that have a good spatial access pattern until the innermost dimension.

Specifically, locality is generally improved if SCCs (statements groups, in general) involving memory access with large strides (e.g., greater that a few tens of bytes, a few hundreds of bytes, a few thousands of bytes, etc.) are not fused or scheduled at the inner dimensions of a loop nest. Likewise, locality can be improved by allowing or encouraging fusion of SCCs (statement groups, in general) involving memory access with small strides (e.g., less than a few thousands of bytes, a few hundreds of bytes, a few bytes, etc.) at the inner dimensions of a loop nest. If a loop nest has m dimensions, where the innermost dimension is referred to as dimension "m" and the outermost dimension is referred to as dimension "1," the inner dimensions may be defined as dimensions greater than or equal to k, where $1 \leq k < m$. In general, m can be 3, 4, 8, 10, 15, etc. and k can be 2, 5, 12, 15, etc.

Since scheduling is typically performed starting with the outermost dimension, progressing to the innermost dimension, a cost model can be designed such that large-strides correspond to higher costs or weights, as shown in FIG. 4A (function 402). As such, fusion of SCCs corresponding to large strides would be favored during scheduling at the outermost dimension and at dimensions other than the inner dimensions. As a consequence, only the SCCs that correspond to small strides would be available during scheduling at the inner dimensions, which can improve memory access locality.

The Gaussian 404 in FIG. 4A can be used to model loops that have a particularly disadvantageous memory access pattern with respect to the cache associativity. The cost function 404 is similar to the function 402 in terms of assigning weights, but it is specific to a particular cache-line size, where strides corresponding to that size should be discouraged at inner scheduling dimensions. Many modern caches only allow data from main memory to be mapped to a few places in cache. The Gaussian 404 models access patterns where each memory access maps to the same place in cache, which would result in data being evicted from the cache every few iterations. Per Equation (11) and Algorithm 1, such access patterns may be permitted at outer scheduling dimensions and are disfavored at inner scheduling dimensions.

FIG. 4B shows the permutability cost model, which aims to cluster permutable loops into bands. A permutable band is a group of consecutively nested loops that satisfy the same set of dependences. This property allows loops in a permutable band to be interchanged without restriction (i.e. any loop ordering is valid), enabling tiling, which may be performed in another phase of the overall compilation process. The particular permutability cost model shown in FIG. 4B focuses on inner levels of cache, as it attempts to schedule the unpermutable loops at the outer levels and cluster the permutable loops at the innermost dimensions. In the cost function shown in FIG. 4B, permutability of a loop is determined with reference to the next outer loop. If the loop is permutable, a high weight is assigned; otherwise a low weight is assigned. As such, in the evaluation per Equation (11), a loop having a high weight may be permuted in favor of other loops. Such a model is also useful when targeting scratchpads, for which the data set of innermost tiled loops must fit in the scratchpad. Since the PERTS does not skew loops, it relies only on the permutability of loops in the input code/program. Since it does not increase permutability, the simple step function shown in FIG. 4B can be sufficient to optimize the placement of permutable loops.

FIG. 4C shows the parallelism cost model, a 2D Gaussian indexed by parallelism type and scheduling dimension. The model considers three types of parallelism—doall (where no dependence is carried), reduction (loop over an associative operator), and sequential (carried dependence). The parallelism cost model shown in FIG. 4C yields the highest score for scheduling hyperplanes that result in doall loops at the outermost loop level, which is indicated by loop index 0. This is appropriate for multi-core architectures targeted through an OpenMP backend for instance. Parallelization of inner dimensions typically introduces more synchronization and, hence, is generally less desirable. Therefore, the cost model shown in FIG. 4C does not put a substantial weight on parallelism after level zero.

Given a pair of SCCs, Equation (11) informs whether the source and destination SCCs can be fused. The terms source SCC and designation SCC indicate a dependence from the destination SCC to the source SCC in the SCC graph. This equation is evaluated at each scheduling dimension, yielding a value of dimension (depth) i for the source SCC and a value of dimension (depth) j for the destination SCC. In general, while performing scheduling at dimension k, the values of i and j that maximize Equation (11) can be used as follows: (i) the source and destination SCCs may be fused within a loop at depth i or j; and/or (ii) a loop at depth i in the source SCC may be permuted; and/or (iii) a loop at depth j in the destination SCC may be permuted. As noted above, permutation may not be performed if the cost of fusion is excessive because the clamping distance d is large.

In general, the weights used in Equation (11) can be derived from a cost function that can be linear, non-linear (such as those described with reference to FIGS. 4A-4C), or non-mathematical. A non-mathematical function may be referred to as a non-analytic function, a procedural function, or a map function. Given a set of inputs, e.g., the stride, the loop depth, etc., a map function need not apply only arithmetic computations to these inputs and, instead, may follow a specified procedure to derive a cost value. Such a procedure may be implemented via a machine-learning model or using an artificial neural network (ANN). Instead of deriving the loop indices I and j by maximizing Equation (11), an ANN may also be used to derive the loop indices. The cost function(s), in general, whether linear, non-linear, or procedural, may be designed to further the goal of improving one or more of locality, communication (by minimizing inter-memory communication overhead), exploration of loop permutation, or improving parallelization.

Referring again to Algorithm 1 (FIG. 3), if there is no solution to the linear programming problem in line 9, the source and destination of the dependence edge are simply not fused. A solution is determined not to be found if no valid schedule can be obtained using the specified constraints. For the source and destination nodes (i.e., for the corresponding statement groupings such as SCCs), the respective permutation hyperplanes that maximize the selected cost model are selected. Thus, for the source SCC, the i-th loop may be permuted and for the destination SCC, the j-th loop may be permuted. Lines 13-15 of Algorithm 1 update the linear programming problem $C_e$ with a linear independence constraint and remove satisfied dependences. It should be understood that while the objective function given by Equation is linear, the weights used therein can be computed using non-linear or procedural functions, as described above.

Smart Fuse: The PERTS under maximum fusion may fuse whenever the ILP formed from the clamping constraints of Equation (9) has a solution. Under smart fusion, scheduling is performed twice—once for fusion and once for fission. Scheduling with fission is straightforward since it simply requires selecting the loop with the highest weight derived from the selected cost model. Either the fusion or fission transformation is then selected based on the following equation:

$$\underset{\theta \in \{Fuse, Fiss\}}{\operatorname{argmax}} F(\theta) + P(\theta) \qquad (12)$$

where $F(\theta)$ represents the data reuse between the two statement groups and $P(\theta)$ represents the benefits (i.e. cost function) from the best permutation found in each case. Thus, if fission enables permutations whose benefit offset the benefit of fusion, the loops are not fused. $F(\theta)$ can be a 1D Gaussian centered at zero and indexed by the product of dependence distance and number of bytes shared between the statement groups. For the fission schedule, the trip count of the loop may be treated as the dependence distance. In the event this is parametric, we can treat the loop count as a large fixed constant (e.g., 1024, 4096, etc.). This allows the PERTS to tailor its transformations based on the size of the loop. $P(\theta)$ can be computed using a linear, a non-linear (e.g., the Gaussian mixture shown in FIG. 4A), or a procedural function.

FIGS. 5A-5C shows an example of how the PERTS differs under max fuse and smart fuse. The program depicted in FIG. 5A computes the multiplication of a 4D tensor, X, with a 2D matrix, M, and stores the result in a second 4D tensor, Y. Note that the statements S1 and S2 in the program as specified, and as shown in FIG. 4A, cannot be directly fused, since this would cause the write at S2 to be overwritten by S1 in the next iteration. Instead, the i loop and m loop of S2 must be interchanged before fusion can be enabled—as seen in FIG. 5B. This transformation, however, is still sub-optimal with respect to S2. Although there is temporal locality on Y and spatial locality on M, the access pattern on X leads to poor locality. This is because fusion is weighted too heavily at the innermost dimensions. A better balance of fusion and permutation can be seen in FIG. 5C. A similar loop ordering, as that shown in FIG. 5B, takes place to enable fusion at the outermost dimensions. At the innermost level, however, the permutation tensor scheduler with smart fusion decides that the locality between S1 and S2 gained from fusing does not justify the poor access pattern that will result on X in S2. By not fusing, the smart fuse scheduler is able to obtain spatial locality on both Y and X and temporal locality on M.

V. Generalized Schedulers

The use of non-linear and/or procedural cost functions is not limited to scheduling according to Algorithm 1 (FIG. 3), which permits only the permutation and/or fusion transforms. These functions allow rapid exploration of a large search space where opportunities for maximizing parallelism while maintaining adequate data locality and/or minimizing the overhead of communication between the main/shared memory and individual/private caches of different processors and among the individual/private caches of different processors. As such, some embodiments of a scheduler permit various types of loop transforms such as reversal, skewing, tiling, etc., in addition to permitting fusion and permutation.

In order to ensure that the scheduler does not run out of memory or does not take excessively long to derive a schedule, memory space only up to a certain size, e.g., 128 MB, 1 GB, etc., may be allocated for the scheduler. In addition, or alternatively, processing capacity and/or time, e.g., in terms of maximum CPU time, a maximum number of CPU cycles, maximum CPU load, a maximum actual time, etc. may be allocated. For each candidate transform, the memory and/or processing requirements of the transform are obtained, e.g., from past experience.

These requirements may be parameterized in terms of one or more characteristics of the program to be scheduled. These parameters may include the number of loop nests in the program, average or maximum depth of the loop nests, the maximum or average number of tensors accessed in the program or in each loop nest, the maximum or average size of the tensors, which can be large (e.g., 10 MB, 200 MB, 1 GB, 150 GB, or more), the maximum or average number of dimensions of the tensors accessed in the program or in each loop, which can also be large (e.g., 5, 12, 20, 40, etc.).

The number of different transforms the scheduler may explore may be determined based on the respective requirements of different transforms and the allocated memory size and processing capacity, such that applying the different transforms would not exceed the allocated memory size and processing capacity. While this can limit the number of transforms explored by the scheduler, the non-linear or procedural cost function (which may also be considered tradeoff or benefit-penalty functions) enable exploring diverse candidate solutions so that a schedule that can simultaneously optimize objectives such as locality, parallelization, data reuse, data communication, processing system utilization, etc., can be obtained.

V. Evaluation

We implemented embodiments of the tensor schedulers described above in the R-Stream compiler (rcc for short), which is a polyhedral compiler, and we compared their performance with that of a conventional scheduler (specifically, rcc's Pluto-style scheduler). The comparison faced one challenge: in rcc, the scheduling process is a series of many passes or phases, some of which correct (using loop permutations, skewings, etc., and sometimes fissions) the mistakes of previous passes. As a result, the effects of a scheduler are only quite indirectly exposed in the final version of the compiled/scheduled program.

In order to address this problem, we analyzed the properties of the GDG right after scheduling. We compared several features over a variety of 66 benchmarks, which includes stencils, basic linear algebra subprograms (BLAS) codes, radar codes, tensor codes, etc. The compared features include: the running times of the schedulers, an indicator of the quality of fusion, and an indicator of parallelism.

To obtain an indicator of the quality of fusion, we ranked the program statements by their so-called "beta" coordinates, a vector of integers that reflects how they are fused. If the common prefix of two statement's beta vector is of length x, it means the statements have been fused up to dimension x. Hence, we sort statements by their beta coordinates, and the fusion indicator is the sum (plus one) of common prefixes of consecutive statements in this sorted list.

An indicator of parallelism is available in statements as per dimension annotations. While we could easily perform a weighted sum of parallelism annotations, we found it hard to find weights that express how important doall parallelism is, compared to permutability, or the availability of a reduction loop. We therefore focused on counting sequential loops out of which parallelism is lost. The parallelism score was computed as: 1.1—(#seq loops/total #loops).

Table 1 shows the average, min, and max of the ratio between indicators of the base scheduler and the corresponding indicators of tensor schedulers.

TABLE 1

| (avg; min; max) | Comparison of Scheduler Performance | | |
|---|---|---|---|
| | time | fusion | parallelism |
| simple | (1.71; 0.86; 4.41) | (1.51; 0.7; 13) | (1.34; 0.56; 7.00) |
| parametric[2] | (1.53; 0.52; 2.52) | (2.04; 0.70; 13) | (1.47; 0.56; 7.67) |
| perm-simple | (1.15; 0.34; 2.40) | (1.28; 0.70; 7.0) | (1.50; 0.57; 11.0) |
| perm-smart | (1.12; 0.33; 2.29) | (1.32; 0.70; 7.0) | (1.50; 0.57; 11.0) |

We observe a general speedup of the scheduling time, decreasing as we increase the sophistication of the tensor scheduler from simple (STS), to parametric (pTS), to perm-simple (PERTS-Max Fuse), to perm-smart (PERTS-Smart Fuse). In some experiments, pTS performed better with fusion. One observation is that none of the schedulers is always the fastest, the best fuser, or the best parallelizer, although the non-permutation schedulers are marginally slower with small input programs. The RStream-TF frontend generates code for combinations of deep learning network layers, and optimizes them through R-Stream. In this case, tensor schedulers can then be invoked by RStream-TF on the appropriate layers.

VII. Conclusion

We introduced four new lightweight schedulers of increasing capabilities and complexity. The different scheduling techniques described above, as well as the methodology proposed to apply them, provide several new alternatives to heavy-weight polyhedral schedulers described in earlier work. These new schedulers provide more efficient and scalable scheduling capabilities for the codes that already expose enough parallelism in their original formulation. The reduced scheduling/compilation times offered by these schedulers are of general interest but also have important and immediate applications in just-in-time (JIT) compilers, for which compilation speed is typically paramount.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for transforming a program having a loop nest for parallelized execution using at least two processors, the method comprising:
   determining a first statement within a first loop nest within a specified program, the first statement accesses one or more tensors from memory;
   for scheduling operations defined by the first statement at a first dimension of the first loop nest, selecting a first statement grouping that comprises the first statement; and
   specifying constraints that limit a scheduler for applying either loop fusion transform or loop permutation transform to the first statement grouping, wherein specifying the constraints comprises:
   determining a first loop index maximizing an objective function;
   designating as permutable in the first loop nest a first loop corresponding to the first loop index; and
   designating all other loops in the first loop nest as non-permutable.

2. The method of claim 1, wherein:
   the specified program comprises a second statement, that accesses at least one of the one or more tensors from the memory, creating a read-after-write, write-after-read, or write-after-write dependence between the first and the second statements.

3. The method of claim 2, wherein the first statement grouping comprises the second statement.

4. The method of claim 1, wherein the first statement grouping is a strongly connected component (SCC).

5. The method of claim 1, further comprising:
   selecting a second statement grouping that: (i) comprises a second statement that is included within a second loop nest and that access from the memory at least one of the one or more tensors, and (ii) has a dependence relation with the first statement grouping.

6. The method of claim 5, wherein specifying the constraints further comprises:
   limiting the scheduler to applying the loop fusion transform only if a dependence distance between the first statement grouping and the second statement grouping is zero.

7. The method of claim 5, wherein specifying the constraints further comprises:
   limiting the scheduler to applying the loop fusion transform only if a maximum dependence distance between the first statement grouping and the second statement grouping is less than or equal to a specified threshold distance.

8. The method of claim 5, wherein specifying the constraints comprises:
   determining a second loop index maximizing the objective function;
   designating as permutable in the second loop nest a second loop corresponding to the second loop index; and
   designating all other loops in the second loop nest as nonpermutable.

9. The method of claim 8, wherein the objective function assigns:
   a respective weight to each loop in the first loop nest;
   a respective weight to each loop in the second loop nest; and
   a penalty proportional to a maximum dependence distance between the first statement grouping and the second statement grouping.

10. The method of claim 9, wherein:
the weight assigned to a candidate loop in the first loop nest is a first function of a dimension of the candidate loop within the first loop nest; or
the weight assigned to a candidate loop in the second loop nest is a second function of a dimension of the candidate loop within the second loop nest; and
the first function or the second function is linear, non-linear, or procedural function.

11. The method of claim 10, wherein the non-linear function is a Gaussian or mixed Gaussian function.

12. The method of claim 9, wherein the respective weight is assigned to a candidate loop within the first loop nest or the second loop nest according to a cost function representing one or more of: locality of memory access resulting from permutation of the candidate loop, permutability of the candidate loop with other loops, or parallelism of operations of the candidate loop.

13. The method of claim 12, wherein the cost function is non-linear or procedural.

14. The method of claim 9, wherein specifying the constraints comprises designating the first loop and the second loop as fusable if the penalty is less than a sum of the respective weights assigned to the first and second loop indices.

15. The method of claim 9, wherein the respective weight for each loop in the first loop nest and the respective weight for each loop in the second loop nest are determined using an artificial neural network (ANN).

16. The method of claim 1, wherein the objective function is specified or is implemented using an artificial neural network (ANN).

17. The method of claim 1, further comprising:
repeating the specifying constraints step for scheduling the operations defined by the first statement at a second dimension of the first loop nest,
wherein the second dimension is inner relative to the first dimension.

18. The method of claim 1, wherein the scheduler is a polyhedral scheduler.

19. A method for transforming a program having a loop nest for parallelized execution using at least two processors, the method comprising:
evaluating, using a non-linear or procedural evaluation function, respective computational improvements in scheduling operations defined by a first loop nest within a specified program by transforming by a scheduler the first loop nest according to a plurality of candidate transforms, wherein evaluation of a particular candidate transform by the scheduler requires a particular memory space and a particular processing capacity; and
limiting a total number of the plurality of candidate transforms such that a total memory space collectively required by the scheduler in evaluating the total number of the plurality of candidate transforms does not exceed an allocated memory space or a total processing capacity collectively required by the scheduler in evaluating the total number of the plurality of candidate transforms does not exceed an allocated processing capacity.

20. The method of claim 19, wherein the processing capacity comprises processor cycles or processor time.

21. The method of claim 19, wherein:
the non-linear or procedural evaluation function represents one or more of: locality of memory access resulting from a permutation of a loop in the first loop nest, permutability of one or more loops in the first loop nest, or parallelism of operations associated with the loop in the first loop nest.

22. The method of claim 19, wherein a first statement within the first loop nest accesses from memory one or more tensors.

23. The method of claim 22, wherein:
a second statement within a second loop nest accesses from the memory at least one of the one or more tensors, creating a dependence between the first loop nest and the second loop nest; and
each candidate transform in the plurality of candidate transforms maintains the dependence.

24. The method of claim 19, wherein the scheduler is a polyhedral scheduler or an artificial neural network (ANN)-based scheduler.

25. The method of claim 19, wherein the non-linear evaluation function is a Gaussian function or a mixed Gaussian function.

* * * * *